United States Patent Office 3,131,164
Patented Apr. 28, 1964

3,131,164
POLYMER COMPOSITIONS STABILIZED WITH BORON COMPOUNDS
Marshall E. Doyle, Alameda, and Gunter S. Jaffe, Oakland, Calif., assignors to Shell Oil Company, New York, N.Y., a corporation of Delaware
No Drawing. Filed July 29, 1960, Ser. No. 46,195
13 Claims. (Cl. 260—45.8)

This invention relates to stabilized polymers of mono-alpha-olefins. More particularly it relates to stabilized compositions and methods for stabilizing polymers of alpha-olefins prepared at low temperatures and pressures.

It is now well known that polymers of mono-alpha-olefins may be prepared at low temperatures and pressures in the presence of catalyst compositions which are commonly referred to as "Ziegler catalysts" or "low-pressure catalysts." These catalysts may be briefly represented by those comprising the reaction product of at least one compound of a metal of groups IV–VI of the periodic table with at least one of the following: (A) aluminum trialkyl, (B) a compound of the formula $R_1R_2AlX$ wherein $R_1$ and $R_2$ are selected from the group consisting of hydrogen and hydrocarbons and X is selected from the group consisting of hydrogen, halogen, alkoxy, aryloxy, the residue of a secondary amine, secondary acid amine, mercaptan, diphenol, carboxylic acid and sulfonic acid, (C) an organo zinc compound, and (D) an organo-magnesium compound. The composition prepared from a compound of the formula $R_1R_2$ AlX in which $R_1$ and $R_2$ are selected from the group consisting of hydrogen and hydrocarbon and X is a halogen with a metal selected from the group consisting of metal from the group VIII of the periodic table or manganese may also be used. Low-pressure polymers of alpha-olefins may also be obtained with a catalyst composition comprising the reaction product aluminum trichloride, titanium tetrachloride and aluminum powder. Still other catalyst compositions are well known for the production of polymers of alpha-olefins at low temperatures and pressures. The polymer produced by the low pressure method requires that steps be taken to improve their stability as the polymer, on aging, will discolor and become embrittled. There are several reasons for this behavior but mainly the need is attributed to the presence of catalyst residues in the polymer and considerable art exists which is directed to processes for removing or reducing the level of catalyst residues. While some success is reported with such processes, it seems that the residues cannot be removed entirely because, perhaps, some of the residues are bound within the polymer and are actually a part thereof. This appears to be particularly the case with the residues of the metals within groups IV–VI of the periodic table. Thus if the catalyst comprises a vanadium compound, then vanadium residues are involved. The same is the case with compounds of zirconium, molybdenum, titanium and others within groups IV–VI depending on the choice of catalyst to carry out the polymerization.

It is an object of this invention to provide novel compositions of polymers of mono-alpha-olefins. It is another object of this invention to provide stabilized compositions of polymers of alpha-olefins. It is a further object of this invention to provide polymers of alpha-olefins which have improved color and thermal stability and which have improved resistance to oxidation. It is yet another object of this invention to provide methods for stabilizing linear or crystalline polyethylene and polypropylene. It is still another object of the present invention to prevent, or at least appreciably reduce, the tendency of the polyolefins to degrade during processing (e.g. milling or molding) operation which are carried out during the manufacture of articles therefrom and also during the subsequent lifetime of such articles.

These and other objects are accomplished by a composition comprising polymer of an alpha-olefin and a minor amount of certain boron compounds which are described below. The polymer thus stabilized will be found to have improved ability to withstand the degradation during processing and aging.

While this invention applies equally to polymers of mono-alpha-olefins, for the sake of convenience, the description of the invention is directed mainly to polyethylene and polypropylene although polymers of other mono-alpha-olefins are also included.

The boron compounds suitable as stabilizers for this invention are selected from the group consisting of (A) an ester of an oxy-acid of boron, (B) a boronic acid, (C) esters of boronic acid, (D) a borinic acid and (E) esters of borinic acid, with the limitation that the organo-boron compounds contain at least one radical having not less than 6 carbon atoms. It will be understood that the use of anhydrides of boronic acid and borinic acid are also suitable in those cases where such anhydrides exist in stable form. As a matter of fact the use of anhydrides instead of the free acid can be particularly advantageous and this may be illustrated by the case of phenyl boronic oxide which is the anhydride of phenyl boronic acid. In addition to the anhydrides as being within the scope of boronic and borinic acids it will be apparent that partial esters are also suitable and are embraced by the esters referred to above.

The compounds suitable for the purposes of the present invention as mentioned above are required to have at least one organic radical that contains not less than 6 carbon atoms. This is necessary because of operability considerations and is illustrated by, for example, triethyl borate which is wholly unsuitable as a stabilizer in the present compositions. It is only when the organo-boron compounds contain at least one radical having not less than 6 carbon atoms that suitable results may be obtained. Furthermore, it makes no difference whether the organic radical containing the needed carbon chain is attached directly to the boron atom or is attached to the boron atom through an oxygen atom. In essence, three related groups of organoboron compounds are involved in the present invention, i.e., ortho-boric acid esters, boronic acid and borinic acid. These may be represented, respectively, by the following formulae:

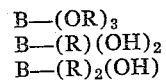

wherein the R's are hydrocarbyl radicals. In the most preferred embodiment, the composition contains as the stabilizer, esters of ortho-boric acid of the above formula wherein the R's are alkyl, cycloalkyl, aryl, or mixtures thereof. Less preferred, but also suitable, are esters of borinic acids and boronic acids. Examples of the more suitable species include the trialkyl borates in which at least one of the alkyl radicals, and preferably all of the alkyl radicals, contain at least 6 carbon atoms such as trilauryl borate, tristearyl borate, trimyristyl borate, and the like. Representative of mixed alkyl aryl borates are those in which an aromatic nucleus contains at least one and more preferably two tertiary alkyl substituents as, for example, in the case of 2,6-dimethyl-phenyl di-n-butyl borate, 2,6-di-tert-butyl-phenyl di-n-butyl borate, 2,6-di-tert-butyl-4-methylphenyl di-n-butyl borate and similar borates containing two alkyl radicals having more than 4 carbon atoms represented by, for example, 2,6-di-tert-butyl-phenyl di-lauryl borate, 2,6-di-tert-butyl-phenyl di-stearyl borate and the like. Similar esters of ortho-boric acid that are suitable are those containing, for example, two alkyl radicals as above such as di(2,6-dialkyl phenyl)-n-butyl borates wherein the alkyl radicals are tertiary butyl radicals. From the foregoing it will be seen that the R of the previously mentioned ortho-boric acid is capable of considerable variation and it is found that they are, in fact, suitable stabilizers for the olefin polymers according to this invention. Other ortho-boric acid esters are represented by the formula B(OR')$_3$ in which R' represents a hydrocarbon radical derived from a carbonyl of the formula

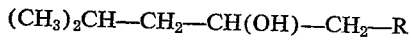

in which R signifies, for example, n-propylene or an alkyl radical having at least 4 carbon atoms. One such compound is tri(2,6,8-trimethyl-4-nonyl)borate; another such compound is tri(2-methyl-7-ethyl-4-undecyl)borate. Other compounds which are representative of the more preferred embodiments of this invention, i.e., esters of ortho-boric acid, are exemplified by tricyclohexyl borate and the ester derived from diisopropyl carbinol and similar carbinols containing gem-dialkyl groups attached to the beta-carbon atoms, the alkyl radicals of the gem-dialkyl groups being ethyl or higher alkyl. Analogous esters prepared from dibenzyl carbinol and derivatives thereof containing tertiary-alkyl substituents in the aromatic nuclei may also be employed. Among representative cyclic boron esters there may be mentioned those of the general formula

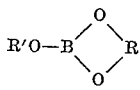

wherein R' is an alkyl, cycloalkyl, aralkyl, aryl or alkaryl radical and R is a divalent alkyl, cycloalkyl, aralkyl, aryl, alkaryl radical. Still further the stabilizers of the present invention may contain more than one boron atom as in the case of glycol diborates such as tri-(hexylene glycol)diborate.

As previously indicated boronic acids of the formula B(R)(OH)$_2$ in which R represents a hydrocarbyl radical containing at least 6 carbon atoms, and esters thereof, are also suitable as stabilizers for polymers of mono-alpha-olefins. The same is the case in relation to the borinic acids of the formula B(R)$_2$(OH) wherein R$_2$ also are hydrocarbyl radicals which may or may not be the same but which, in any case, have at least one hydrocarbyl radical containing 6 carbon atoms, and esters thereof. As representative of compounds within the above groups, there may be mentioned phenyl boronic acid and its alkyl esters as the dinonylate, di(methyl-isobutyl-carbinyl)methyl boronate, 2,4-pentane-diol methyl boronate, hexylene glycol n-butyl boronate, di-phenyl borinic acid, distearyl borinic acid, diethyl stearyl borinate and the like.

The suitability of the boron compounds described above as stabilizers for polymers of mono-alpha-olefins, particularly those containing catalyst residues of metals from groups IV–VI of the periodic table, is difficult to explain on theoretical grounds and accordingly no explanation is offered here. However, it appears that there is something unique or special in the structure B—(O—)$_n$. In the most preferred embodiments $n$ is 3 and when $n$ is 2 the results are also highly desirable followed by those instances where $n$ is 1. Further improvements in the stabilization of the polymers may be obtained when the boron compounds are used together with other stabilizers that are suitable in compositions containing polymers of mono-alpha-olefins. Among such other stabilizers there may be mentioned various derivatives of benzophenone such as 2,4,4'-trihydroxybenzophenone, 2-hydroxy-4-dodecyloxybenzophenone, organic phosphites as triphenyl phosphite, polymeric glycidyl polyethers, alkyl tin esters, cadmium and calcium stearate and others. Particularly noteworthy are the dialkyl esters of thiodialkane carboxylic acids having the formula R$_3$OOCR$_1$SR$_2$COOR$_4$ wherein R$_1$ and R$_2$ are similar or dissimilar divalent aliphatic hydrocarbon radicals having at least 2, and preferably not more than 4 carbon atoms and R$_3$ and R$_4$ are alkyl, cycloalkyl and/or arylalkyl groups. Representative of this class of compounds are the dialkyl esters of beta-thiodithiopropionic acid such as dilauryl beta-thiodipropionate, distearyl beta-thiodipropionate, and the like. It will be readily appreciated that in addition to stabilizers the compositions of this invention may contain pigments, fillers, plasticizers, internal lubricants such as stearic acid and the like and yet the compositions will enjoy improved stability.

The quantity of the boron compounds employed as stabilizers according to the present invention may range from 0.01% up to about 5% by weight of the polymer. The more preferred members may be employed in amounts ranging between about 0.25 and 3% by weight with amounts in the order of 0.5 to 1% by weight being usually adequate. With the less preferred members, the large amounts are normally employed although the amounts may be reduced considerably when they are employed together with other stabilizers as previously indicated. When the composition is to contain a plurality of stabilizers the total amount of stabilizers rarely exceed 5% by weight of the polymer.

In addition to stabilizing polyethylene and polypropylene, other polymers of mono-alpha-olefins may be stabilized as polystyrene, ethylene-propylene copolymers, and polymers of higher alpha-olefins including the polymer and copolymers of octene-1, dodecene-1 and octadecene-1. A class of polymers that are also suitable for the purposes of the present invention are branched mono-olefins such as 2-methylpentene-1, 2-methylhexene-1, and similar polymers and copolymers thereof, such as the copolymer of 2-methylpentene-1 and ethylene.

The methods of producing the polymers or copolymers form no part of this invention except that, as previously indicated, they are produced by the above-mentioned low-pressure type catalysts formed, for example, by mixing an aluminum trialkyl as aluminum triethyl or an aluminum dialkyl halide as aluminum diethyl chloride with, for example, titanium tetrachloride or titanium trichloride in hydrocarbon solvent and thereafter using the reaction product as the catalyst for the polymerization of ethylene or propylene. Actually, the stabilizers of the present invention are also found to be useful in compositions of polyolefins prepared by the so-called "high pressure" processes which employ free radical catalysts. However, in those cases the stabilizing effect is less pronounced since they do not suffer from the thermal degradation and discoloring that is experienced by the polymers produced by the Ziegler or low-pressure processes.

The stabilizers are conveniently blended with the olefin polymer by working a mixture of the polymer and the organo-boron compounds, usually at elevated temperatures depending upon the particular olefin employed. For polyethylene a milling temperature between about 100° C. and 200° C. is usually suitable while temperatures somewhat higher are normally employed for the milling of polypropylene. On the other hand, some of the branched polymers and copolymers are processed at lower temperatures and it is during the milling that the stabilizers are conveniently incorporated into the composition. In addition to milling, extruding or Banbury mixing provides other convenient means for preparing the composition of this invention. Because of the elevated temperatures employed during the preparation of blends some degradation of the boron stabilizers may be experienced in which case the stabilizing effect of the organo-boron compounds may be reduced. For this reason, there is considerable advantage in employing organo-boron compounds that have as many as 40 carbon atoms.

The invention is described in greater detail as it relates to various species of polymer and organo-boron compounds according to the above description. It should be understood, however, that the examples are for purposes of illustration only and are intended to demonstrate some of the more preferred embodiments of the invention. Further, it will be fairly apparent to persons skilled in the art that the examples may be modified not only in relation to the polymers employed but also in relation to the various organo-boron compounds that may be substituted in the examples. In the first group of examples, various results with polyethylene are described. The polyethylene is prepared by polymerizing ethylene with a catalyst that comprises the reaction product of hydrocarbon solutions of titanium tetrachloride and aluminum diethyl chloride. The resulting polyethylene is recovered and washed with acidified ethanol followed by a plurality of washes in ethanol and water to reduce the portion of the catalyst residues contained therein. Thereafter the polyethylene is blended with various amounts of the indicated boron compounds by milling for the indicated periods of time on a two-roll mill with a mill surface temperature of about 160° C. The resulting blends are subsequently pressed into sheets for color determinations. The intrinsic viscosity (I.V.) of the polymer is determined as a 0.1% solution in Decalin at 120° C. and the melt index (M.I.) is determined by the standard cup method. The color ratings are obtained in a standard reflectivity test based on a color rating of 100 for a standard white wafer in the form of magnesium carbonate.

TABLE I

| Additive (amount, phr.) | I.V. | | | Melt Index | | | Color | | |
|---|---|---|---|---|---|---|---|---|---|
| | Milling time (mins.) | | | Milling time (mins.) | | | Milling time (mins.) | | |
| | 0 | 30 | 60 | 0 | 30 | 60 | 0 | 30 | 60 |
| None | 2.42 | 1.45 | 1.23 | 0.29 | 1.24 | 6.31 | 86 | 90 | 87 |
| Boron ester A (0.3) | 2.30 | 2.43 | 2.06 | 0.33 | 0.33 | 0.28 | 86 | 86 | 85 |
| Boron ester B (0.3) | 2.38 | 2.24 | 2.10 | 0.25 | 0.29 | 0.20 | 80 | 80 | 80 |

A is 2,6-di-t-butyl-phenyl di-n-butyl borate.
B is 2,6-di-t-butyl-4-methyl-phenyl di-n-butyl borate.

Similar results are obtained when the boron ester is tristearyl borate, tri(hexylene glycol)diborate, tricyclohexyl borate and other borates. Suitable results following the same procedures may be obtained with boronic and borinic acid, diphenyl borinic acid, and di(methylisobutylcarbinyl) methyl boronate.

In another series of experiments the same polyethylene used above is blended with 0.3 phr. of 2,6-di-t-butyl-phenyl di-n-butylborate by milling on a two-roll mill at 160° C. The resulting blend is then tested by extrusion at 220° C. in a Shaw extruder and by injection molding in a Hupfield machine at both 240° C. and 280° C. and the color rating, intrinsic viscosity and melt index are determined and the results are given in Table II.

TABLE II

*Physical Properties After Processing*

| Extruded at 220° C. | | | Injection molded at 240° C. | | | Injection molded at 280° C. | | |
|---|---|---|---|---|---|---|---|---|
| Color | IV | MI | Color | IV | MI | Color | IV | MI |
| 90 | 2.70 | 0.15 | 84 | 2.27 | 0.11 | 82 | 1.81 | 1.97 |

Following the procedures indicated above, polyethylene is blended with various amounts of tristearyl borate and a dialkyl phenol sulfide as 4,4'-thio-bis-(3-methyl)-6-t-butylphenol, hereafter referred to as "the sulfide." Milling is at 160° C. on a two-roll mill and thereafter the blends are pressed into sheets for color determination. Portions of each sample of the polyethylene are removed after milling for 30 minutes and also pressed into sheets. The samples were also compression molded at 280° C. and the color determined after molding. The results are indicated in Table III using the same methods of determination previously mentioned.

TABLE III

| Additive (amount, phr.) | Melt Index | | | Color | | | After molding |
|---|---|---|---|---|---|---|---|
| | Milling time (mins.) | | | Milling time (mins.) | | | |
| | 0 | 30 | 60 | 0 | 30 | 60 | |
| None | 0.19 | 0.17 | 0.69 | 87 | 85 | 82 | 81 |
| The sulfide (0.05) | 0.21 | 0.25 | 0.22 | 81 | 78 | 70 | 70 |
| Tristearyl borate (0.5) and the sulfide (0.02) | 0.18 | 0.16 | 0.30 | 89 | 89 | 88 | 75 |
| Tristearyl borate (0.5) | 0.25 | 0.22 | 0.21 | 82 | 81 | 74 | 83 |

When dilauryl beta-thio-dipropionate is used together with the tristearyl borate, still better results are observed.

Another sample of polyethylene, prepared as indicated above, having an I.V. of 2.8, is blended with 0.3 phr. of phenyl boronic oxide by milling on a two-roll mill at 160° C. for 60 minutes. The control experiment of the same polyethylene is subjected to similar milling but in the absence of the phenyl boronic oxide. It is observed that appreciable thermal degradation occurs in the case of the polyethylene milled in the absence of the stabilizer as is clearly evidenced by the physical appearance of the milled polyethylene. In contrast, the blend of polyethylene and phenyl boronic oxide shows no such evidence of thermal degradation even after 60 minutes of milling at 160° C. Furthermore, the color of the stabilized sample is much better compared to the control sample that contained no phenyl boronic oxide.

The following examples indicate the range of usefulness of the present invention for the stabilization of polypropylene. The polypropylene employed is unstabilized "Profax" provided by the Hercules Powder Company. The polypropylene is known to contain small amounts of aluminum and titanium. For these tests, the stabilizer is dissolved in a solvent and the solution is mixed into the polypropylene. Thereafter the solvent is separated by evaporation. The polymer, containing the stabilizer, is then pressed for 3 minutes at about 1500 p.s.i. at 200° C. to give films that range from $5\text{-}10/_{1000}$ of an inch in thickness. Test strips are exposed in an Atlas Weatherometer Model X–W in which the water cycle is not used. In this case the time is given, in days, before complete embrittlement takes place.

| Stabilizer | Amount, phr. | Weatherometer |
|---|---|---|
| None | | nil |
| Boron ester A | 0.025 | 19.0 |
| | 0.5 | 21.0 |
| | 1.0 | 27.0 |
| Boron ester B | 0.025 | 11.5 |
| | 0.5 | 12.5 |
| | 1.0 | 18.5 |

In addition to the above tests, sample strips are exposed to natural weathering conditions and in both cases several months elapsed before the degradation due to atmospheric oxygen and ultraviolet light seriously affected the polypropylene. Heat stability on oven aging is poor but satisfactory results are obtained when phenolic antioxidants are used together with the boron compounds.

In addition to the above borates as stabilizers, a plurality of experiments are conducted using from .25 to 1.0 phr. of tristearyl borate, 2,4-pentane-diol methyl boronate and borinic acid in compositions of polypropylene. In all cases comparable results to those shown in the above tables are obtained.

From the foregoing it will be appreciated that the present invention may be modified in many ways. Thus, for example, the methods of adding or blending the additives may be modified as desired but in any case care should be taken to provide a homogeneous blend of the stabilizer in the polymer. Further, it will be appreciated that the present invention does not rely in any way on the numerous methods or techniques for producing the polymers that may be employed, and such matters will be readily understood by persons skilled in the art.

We claim as our invention:

1. A composition comprising a normally solid polymer selected from the group consisting of homopolymers of an alpha-monoolefin and copolymers of mixtures of alpha-monoolefins with each other, having incorporated therein a stabilizing amount of an organo-boron compound selected from the group consisting of (A) esters of oxy-acids of boron containing as substituents only hydrocarbon radicals selected from the group consisting of alkyl, cycloalkyl, aralkyl, aryl, and alkaryl, (B) boronic acids containing as substituents only hydrocarbon radicals selected from the group consisting of alkyl and aryl and (C) borinic acids containing as substituents only hydrocarbon radicals selected from the group consisting of alkyl and aryl, wherein at least one of the said hydrocarbon radicals of the organo-boron compound contains not less than six carbon atoms.

2. A composition comprising a normally solid polymer selected from the group consisting of homopolymers of an alpha-monoolefin and copolymers of mixtures of alpha-monoolefins with each other, having incorporated therein from about 0.01% to about 5% by weight of polymer of an ester of an oxy-acid of boron containing as substituent groups only hydrocarbon radicals selected from the group consisting of alkyl, cycloalkyl, aralkyl, aryl, and alkaryl of which at least one of said radicals contains not less than six carbon atoms.

3. A composition comprising a normally solid polymer selected from the group consisting of homopolymers of an alpha-monoolefin and copolymers of mixtures of alpha-monoolefins with each other and from about 0.01% to about 5% by weight of polymer of 2,6-di-t-butyl-phenyl-di-n-butyl borate.

4. A composition comprising a normally solid polymer selected from the group consisting of homopolymers of an alpha-monoolefin and copolymers of mixtures of alpha-monoolefins with each other and from about 0.01% to about 5% by weight of polymer of 2,6-di-t-butyl-4-methylphenyl-di-n-butyl borate.

5. A composition comprising a normally solid polymer selected from the group consisting of homopolymers of an alpha-monoolefin and copolymers of mixtures of alpha-monoolefins with each other and from about 0.01% to about 5% by weight of polymer of tristearyl borate.

6. A composition comprising a normally solid polymer selected from the group consisting of homopolymers of an alpha-monoolefin and copolymers of mixtures of alpha-monoolefins with each other and from about 0.01% to about 5% by weight of polymer of a boronic acid containing as substituents only hydrocarbon radicals selected from the group consisting of alkyl and aryl wherein at least one of the said hydrocarbon radicals contains not less than six carbon atoms.

7. A composition comprising a normally solid polymer selected from the group consisting of homopolymers of an alpha-monoolefin and copolymers of mixtures of alpha-monoolefins with each other and from about 0.01% to about 5% by weight of polymer of a borinic acid containing as substituents only hydrocarbon radicals selected from the group consisting of alkyl and aryl wherein at least one of the said hydrocarbon radicals contains not less than six carbon atoms.

8. A composition comprising a normally solid polymer selected from the group consisting of homopolymers of an alpha-monoolefin and copolymers of mixtures of alpha-monoolefins with each other and from about 0.01% to about 5% by weight of polymer of diphenyl borinic acid.

9. A composition comprising a normally solid polymer selected from the group consisting of homopolymers of an alpha-monoolefin and copolymers of mixtures of alpha-monoolefins with each other and from about 0.01% to about 5% by weight of polymer of di(methylisobutylcarbinyl)methyl boronate.

10. A composition comprising a normally solid polymer selected from the group consisting of homopolymers of an alpha-monoolefin and copolymers of mixtures of alpha-monoolefins with each other and from about 0.01% to about 5% by weight of polymer of phenyl boronic oxide.

11. A composition comprising a normally solid polymer selected from the group consisting of homopolymers of an alpha-monoolefin and copolymers of mixtures of alpha-monoolefins with each other and from about 0.01% to about 5% by weight of polymer of 2,4-pentanediol methyl boronate.

12. The composition of claim 1 wherein the polymer is polypropylene.

13. The composition of claim 1 wherein the polymer is polyethylene.

References Cited in the file of this patent
UNITED STATES PATENTS

| | | |
|---|---|---|
| 2,526,506 | Rogers et al. | Oct. 17, 1950 |
| 2,617,783 | Slocombe et al. | Nov. 11, 1952 |